United States Patent
Flaspeter

(10) Patent No.: US 6,676,551 B2
(45) Date of Patent: Jan. 13, 2004

(54) BELT CHANGING DEVICE

(76) Inventor: Michael Flaspeter, 2950 140$^{th}$ Ave. NE., Ham Lake, MN (US) 55304

( * ) Notice: Subject to any disclaimer, the term of this patent is extended or adjusted under 35 U.S.C. 154(b) by 333 days.

(21) Appl. No.: 09/797,023

(22) Filed: Mar. 2, 2001

(65) Prior Publication Data

US 2003/0054909 A1 Mar. 20, 2003

(51) Int. Cl.$^7$ .................................................. F16H 7/24
(52) U.S. Cl. ......................................................... 474/130
(58) Field of Search ........................................ 474/130

(56) References Cited

U.S. PATENT DOCUMENTS 6,334,827 B1 * 1/2002 Tsuchiya .................... 474/119

FOREIGN PATENT DOCUMENTS

| FR | 2594514 | * | 8/1987 | .................. 474/113 |
| JP | 8215953 | * | 8/1996 | ........... B23P/19/00 |
| JP | 1026197 | * | 1/1998 | ............. F16H/7/24 |

* cited by examiner

Primary Examiner—Thomas R. Hannon
Assistant Examiner—Vicky A. Johnson
(74) Attorney, Agent, or Firm—Angenehm Law Firm; N. Paul Friederichs

(57) ABSTRACT

A device for changing the drive belt in a machine having power transmitted by a trapezoidal flexible drive belt, a circular adapter plate for attachment to the terminal end of the shaft having the pulley having the spring means having an attachable compressor with a bail and a connector yoke, the connector yoke being shaped approximating a semi-circular flattened annulus, the inner radius being sized to fit about the adapter plate carried on the shaft, the outer being sufficiently larger to provide the necessary strength and provide for the attachment of the bail; the bail being pivotally attached to the yoke and having a planer graspable handle and an offset bearing pad, the bearing pad extending outwardly from the plane of the bail and affixed proximate the pivotal attachment to the connector yoke forming the "L" shape of the bail, the bearing pad further being adapted to engage the extension of the movable sheave of pulley with the spring means.

15 Claims, 3 Drawing Sheets

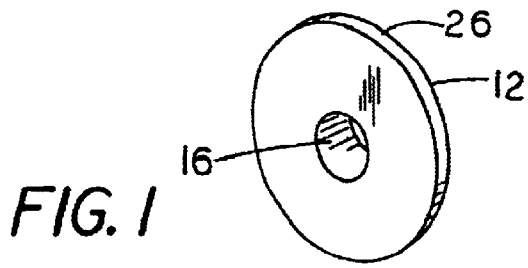
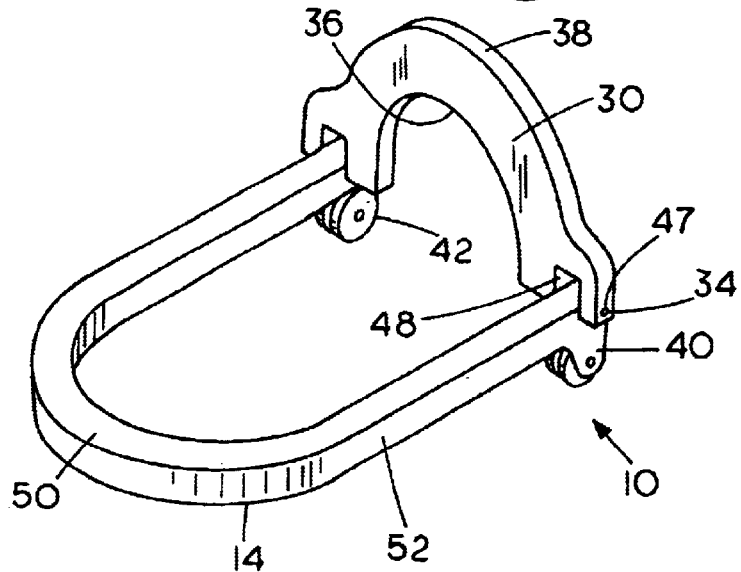
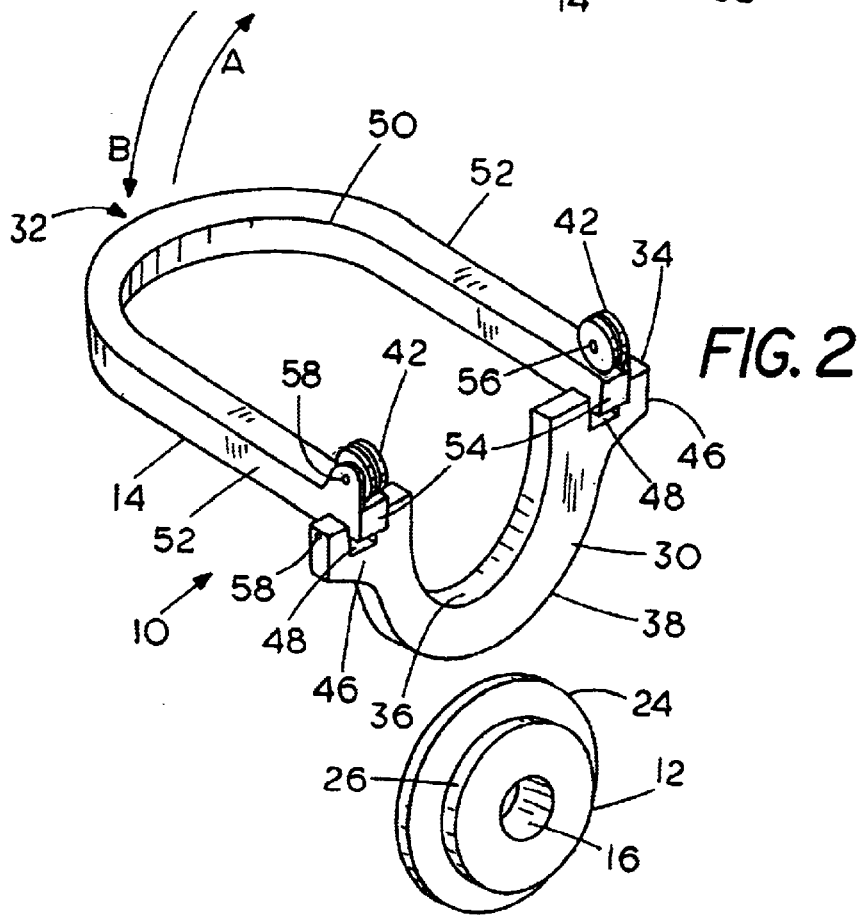

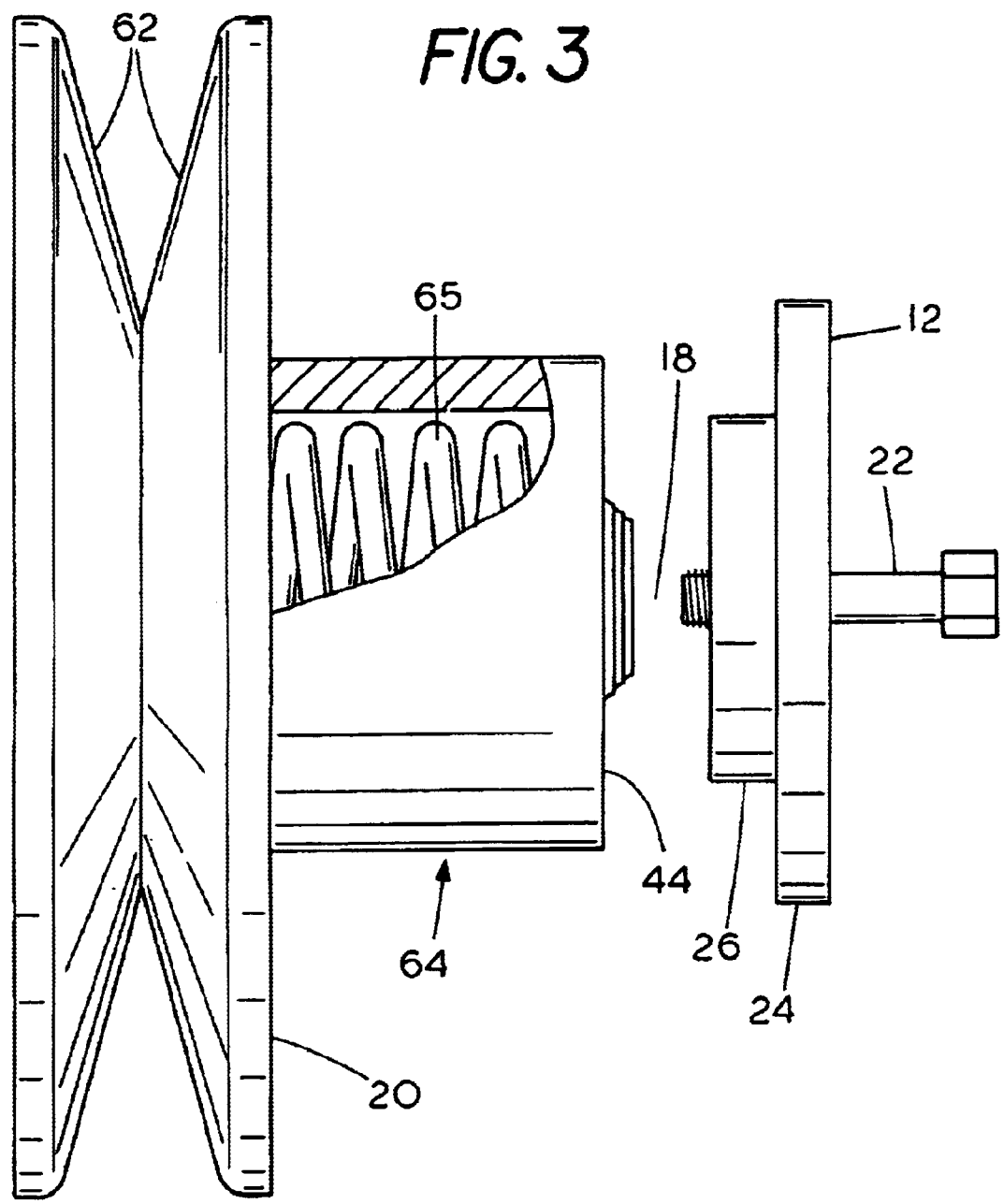

BELT CHANGING DEVICE

BACKGROUND OF THE INVENTION

The invention relates to snowmobile maintenance and more particularly to the changing drive belts on snowmobiles and other machines using variable ratio drive belts. The recent popularity of snowmobiles for winter recreation has increased the number of both snowmobiles and snowmobilers. This has brought less experienced and less mechanically inclined people to the sport of snowmobiling. This surge in popularity, has brought one unintended consequence with the less experienced operators, more drive belts are becoming inoperative in the field.

The operation of a typical snowmobile involves the transmission of the power of the engine through a variable ratio drive belt and thence to the track. In the transmission of the power developed by the engine of a snowmobile, it is conventionally transmitted through a flexible, usually composite rubber, belt to a counter shaft and thence through a drive chain to the flexible track of the snowmobile that engages the snow or other surface that the snowmobile is riding upon.

Additionally, the belt drive uses variable diameter pulleys to provide a variable drive ratio to providing gear reduction to have increased power for starting and providing no gear reduction to allow a sufficiently high top speed and acceptable fuel economy. Usually, the variable ratio is accomplished using a pair of pulleys having a movable side or flange so that when the flanges of the pulley are separated, the effective diameter of the pulley is reduced, and when the flanges of the pulley are moved together, the pulley diameter is increased so that with the pair of pulleys working in concert, the drive ratio can be changed over a fairly wide range. This allows a snowmobile to have a reduction to a low drive ratio allowing the engine to develop sufficiently high revolutions to produce power to both start the snowmobile from a stopped position and negotiate a steep incline successfully and as the load decreases, and the speed increases, a lower drive ratio to provide the snowmobile with a sufficiently speed for economical cruising.

While the current drive belts are relatively long lived, the belts are a wear item and periodically wear out and must be replaced. The replacement of the drive belt involves a certain amount of strength, skill, and, all too frequently, frustration. Were the life of the drive belts predictable and a user judicious in performance of preventive maintenance, all of the belt changes could be performed in the comfort of an inside shop where a complete set of tools is available as part of scheduled maintenance. However, reality is that the life of a drive belt is unpredictable and may break or otherwise become unusable at any time, all too frequently, in the field miles away from a shelter or service facility. Upon this unpleasant occurrence, the user must replace the belt in the cold and the snow, often without adequate tools to assist him in performing the repairs. The unpleasant task is further complicated by the necessity of wearing gloves or mittens as protection from the cold weather.

The conventional method of changing belts involves manually forcing the sheaves of the drive pulley apart and holding the sheaves in this position while removing the old belt and then placing the new belt onto the pulleys while still holding the sheaves apart. Often, the user has difficulty separating the sheaves of the pulley and once the sheaves are separated, and the old belt removed, the sheaves are allowed to go back together and they must be again separated to install the new belt. Users, occasionally, will attempt to wedge a tool or other object between the sheaves of the pulley to keep the sheaves separated while changing belts. This procedure can work quite well in some circumstances, but, can lead to scoring the pulley sheave which significantly increases the wear and reduces the life of subsequent belts. The only solution being to replace a rather expensive pulley.

The invention disclosed herein is a tool which separates the sheaves of the drive pulley and holds the sheaves in a separated position from the end of the pulley thereby making it much easier and more convenient to change a drive belt while eliminating the scoring or defacing problems inherent with use of a tool to pry the sheaves apart directly. The invention acts only on the shroud of the pulley and not on the faces of the pulley.

SUMMARY OF THE INVENTION

When changing a drive belt on a snowmobile or the like, if the old drive belt has not broken, it must first be removed by forcing the flanges of the one pulley apart to reduce their effective diameter so that both the drive pulley and the driven pulley are at a minimum effective diameter so as the drive belt can be removed. The flanges of the drive pulley are typically held together by springs and the tension of these springs must be overcome and the flanges held apart to remove the drive belt. If the flanges are then allowed to come back together, they must be reopened to allow the installation of a new belt. While this task is difficult to do in a warm shop with the snowmobile on a bench, it can become nearly impossible in the cold with the snowmobile nestled down in the snow. This is particularly true where the user must wear gloves or mitts as protection from the cold.

The invention disclosed herein is a tool that allows a user to easily and readily urge the flanges of a drive pulley apart and hold the flanges apart while removing the defective drive belt and replacing the drive belt with a new drive belt. More particularly, the invention includes a small circular adapter plate that is attached to the terminal end of the shaft carrying the drive pulley and a pivoting tool having a yoke that engages the adapter plate and locates the tool so as that the user can actuate the handle to move the drive pulley flanges apart and hold the pulley flanges apart to change the drive belt and after replacing the drive belt with a new drive belt, release the handle, and thereby allow the pulley flanges to be urged together by the spring and return to their resting position.

BRIEF DESCRIPTION OF THE DRAWINGS

Figure One is an overall perspective view of the adapter plate and compressor.

Figure Two is another overall perspective view of the adapter plate and compressor as shown from a different viewpoint.

Figure 4:
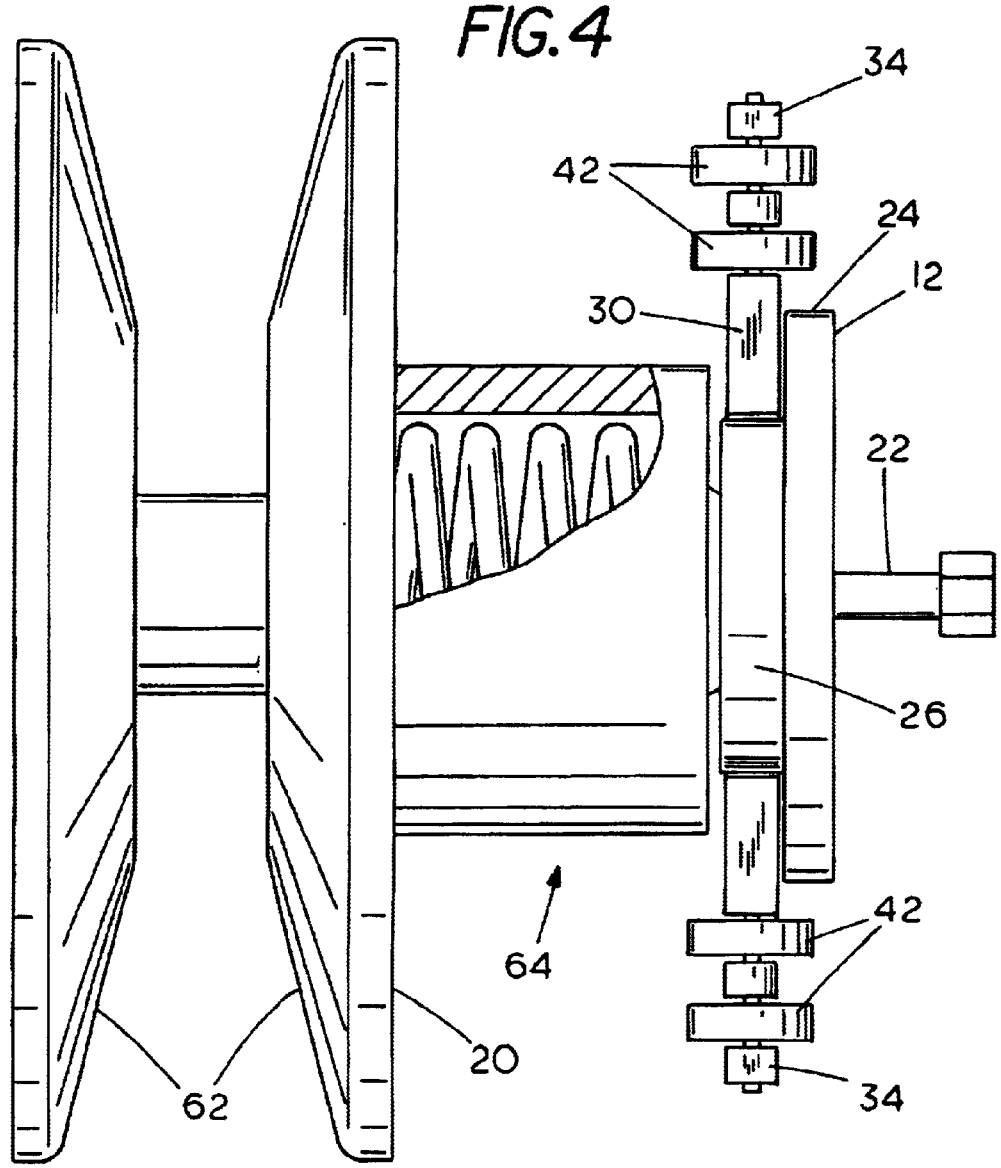
Figure 5:
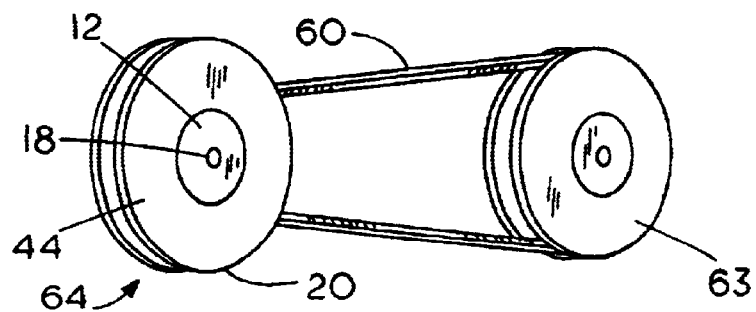

Figure Three is a plan view showing the adapter plate exploded away from the drive pulley with the sheaves of the drive pulley in an adjacent position.

Figure Four is a plan view showing the adapter plate attached to a drive pulley and the drive pulley sheaves separated.

Figure Five is an overall perspective view of a variable ratio drive pulley system with the adapter plate attached to the drive pulley.

DESCRIPTION OF THE PREFERRED EMBODIMENT

Looking first to Figure One, which shows the belt changing tool 10 which consists of the adapter plate 12 and the separator 14. The adapter plate 12 is a circular disk having a central attachment opening 16 for attaching the adapter plate 12 to the pulley shaft 18, as shown in Figure Two. Figure Three shows the adapter plate 12 exploded away from the pulley 20 with the attachment bolt 22 partially removed. As can be seen, the adapter plate 12 has larger diameter outer flange 24 and a reduced diameter inner flange 26.

The separator 14 has a yoke 30 and a handle 32 which are pivotally joined through a hinge means 34. The yoke 30 may be of any selected shape, and is preferably semi-circular in shape having an inner periphery 36 sized to fit closely about the inner portion 26 of the adapter plate 12. The outer periphery 38 or the yoke 30 may be of any selected shape and is preferably a smooth shape. The outer periphery 38 is spaced away from the inner periphery 36 a sufficient distance such that the yoke 30 material has sufficient strength so that the yoke 30 does not deform in use. Of necessity, the distance and therefore the width of the yoke 30 will vary depending on the choice of construction materials and the particular application.

The handle 32 may be of any suitable shape so as to be graspable by the user and is pivotally attached to the hinge means 34 of the yoke 30. The handle 32 further has a pair of offset ears 40 formed on the end adjacent the hinge means 34. The offset ears 40 may terminate in a rounded ramp or any other suitable shape and preferably have at least one roller 42 mounted on the terminal end of each ear 40. The offset ears 40 are located approximately at right angles to the handle 32 so that when the handle 32 is moved in a direction as indicated by "A" in Figure two, the ears 40 move from a location coplanar with the yoke 30 to a location spaced away from the plane of the yoke.

The separator 14 may be constructed from any suitable material having sufficient strength such as metal, certain high strength polymers, or glass filled plastics. The rollers 42 may be constructed of the same or of a different material than the separator 14. The surface of the rollers 42, however, must be sufficiently hard so as to not deform as the rollers 42 are pressed against the drive pulley housing 44.

The adapter plate 12 when attached to a pulley shaft 18, as shown in Figure Four, provides an inner flange 26 sized to be slightly smaller than inner periphery 36 of the yoke 30 so that the yoke 30 may be placed over the inner flange 26 and retained thereat by the outer flange 24 thusly retaining the yoke 30 longitudinally with respect to the pulley shaft 18. In most variable ratio drive systems, the terminal end of the pulley shaft 18 is conventionally drilled and tapped to receive a bolt 22 and the adapter plate 12 may be attached merely by turning a bolt 22 into the existing threads, if, however, the pulley shaft 18 is not so drilled and tapped, the pulley shaft 18 must be drilled and tapped before the adapter plate 12 may be attached.

In the preferred embodiment of the belt changing tool 10, the adapter plate 12 may be constructed of aluminum alloy, iron, polymer, or other such material. The adapter plate 12 may be machined from a single billet of aluminum or constructed from two circular pieces of aluminum fused together. When constructed from two pieces of aluminum, a first piece is formed the outer flange 24 and the second piece forming the inner flange 26 with concentric center holes formed in each piece. The two pieces forming the adapter ring may be joined by welding, spot welding, adhesives, or other suitable means. The center hole of the second piece forming the inner flange 26 is sized to accept the shank of the attachment bolt 22. The center hole 16 in the first piece forming outer flange 24 of the adapter plate 12 may be the same size as the center hole of the second piece forming the inner flange 26, or is preferably a larger diameter to receive the head of the attachment bolt 22 thus recessing the head of the attachment bolt 22.

Similarly, in the preferred embodiment of the belt changing tool 10, the separator 14 is constructed of aluminum alloy. Both the yoke 30 and the handle 32 are fabricated from 0.25 inch aluminum alloy stock. The yoke 30 is cut to a suitable shape, having an inner periphery 36 diameter approximating the diameter of the inner flange 26 so that the yoke 30 fit about the inner flange 26 and be retained by the outer flange 24 the outer periphery 38 may be any suitable shape, and it is convenient to form the outer periphery 38 concentrically circular. The width of the yoke 30 is increased near the ends forming tabs 46 and a slot 48 is formed therein to receive the handle 32. The tabs 46 are further drilled to receive the hinge means 34. The preferred hinge means 34 is simply a pin of sufficient strength passing through the tabs 46 and the handle 32, a readily available pin is a roll pin. When roll pins are used, the hole 47 in the yoke tabs 46 is sized to be an interference fit with the roll pin. Roll pins are well known and readily available in many sizes from many different sources.

The handle 32 may be similarly fabricated from 0.25 inch aluminum alloy stock. When first cut from aluminum stock, the handle 32 can be a flat strip with its offset ears 40 formed at the respective ends. The handle 32 is then bent to have a semicircular portion 50 located approximately equidistant from each end. The handle 32 is also sufficient length so that a straight portion 52 separates the semicircular portion 50 from the offset ears 40. The semicircular portion 50 is formed to a radius so that the terminal ends 54 of the handle 32 are spaced apart a distance equal to the spacing of the yoke slots 48 so that the terminal ends 54 bearing the offset ears 40 are received in the yoke slots 48. The terminal ends 54 are also drilled to receive the pivot point of the hinge means 34. When roll pins are used as the hinge means 43, the holes (not shown) are sized to allow the roll pins to easily turn in the hole.

The rollers 42 are similarly fabricated from 0.25 inch aluminum alloy stock. While only one roller is needed per offset ear 40, it is preferred to use two rollers 42 per offset ear 40. Each roller 42 is fabricated as a disk and is drilled with a center hole 56. The center hole 56 is sized to interferingly receive a roll pin 58 as an axle. Thus, a slightly larger hole may be formed in each offset ear 40 and a roll pin 58 placed therein, and rollers 42 pressed onto each end of the roll pin 58 to form the roller 42 pair.

It is understood that when the belt changing tool 10 is fabricated, that it is not necessary that the component parts be machined, but, that the component parts may be molded or otherwise fabricated.

In its operation, the user selects an appropriately sized belt changing tool 10 for his snowmobile or other application. If necessary, the pulley shaft 18 is drilled and tapped to receive an attachment bolt 22. The attachment bolt 22 is passed through the central attachment opening 16 of the adapter plate 12, as shown in FIG. 3. The attachment bole 22 is threaded into the pulley shaft 18 and that adapter plate 12 is drawn adjacent the pulley shaft 18, as shown in FIG. 4 completing the installation. The separator may then be stored on the snowmobile where it is readily available when needed.

The discussion of operation will with regard to changing a belt 60 on a snowmobile, it being understood, that the procedure is similar and equally applicable when the drive belt is used on another apparatus. When in the operation of the snowmobile, or other apparatus, the belt 60 is either broken, worn, or otherwise requires changing, any shrouds or housings that need to be opened to access the drive pulleys 18 are opened or removed. The separator 14 is hinged to the position as shown in FIG. 2 and placed over the adapter plate 12 so that the inner periphery 36 of the yoke 30 is adjacent the inner flange 26 of the adapter plate thus retaining the separator 14 longitudinally with respect to the pulley shaft 18 by the outer flange 24 of the adapter plate 12. At this time, the sheaves 62 of drive pulley 64 are in an adjacent position as shown in FIG. 3. The handle 32 the separator 14 is moved in a direction as shown by arrow "A" in FIG. 2 moving the rollers 42 from the plane of the yoke 30 allowing the rollers to bear on the drive pulley housing 44 and thence move and hold the pulley sheaves 62 in a spaced apart position, as shown in FIG. 4, against the tension of the drive pulley springs 65.

When the drive pulley 64 is held with the sheaves 62 spaced apart it has a minimum effective diameter, and the worn drive belt 60 can be removed and replaced by a new drive belt 60. After the new drive belt 60 is placed over the drive pulley 64 and the driven pulley 63, the handle of the separator 14 is moved in the direction as shown by arrow "B" in FIG. 2 moving the rollers 42 substantially into the plane of the yoke 30 and allowing the sheaves 62 of the drive pulley 64 to return to approximately their adjacent position, as shown in FIG. 3. The sheaves 62 will not return to this adjacent position because the belt 60 is usually wedged partway down the sheaves 62 and will hold the sheaves 62 somewhat apart until the drive pulley 64 is rotated allowing the drive belt 60 to climb to a position near the periphery of the drive pulley.

With the belt change completed, the user removes the device 10, closes any shrouds or housings that had been previously opened, and the snowmobile may be started and driven again.

Although the present invention has been described with reference to preferred embodiments, workers skilled in the art will recognize changes may be made in form and detail without departing from the spirit and scope of the invention.

What is claimed:

1. A device for changing belts on a variable drive ratio power transmission comprising:

adapter means for adaptive connection to at least one pulley, the pulley having sheaves urged together by at least one spring;

separator means for separating the sheaves of the pulley, the separator means joined to the adapter means; and selective retainer means for retaining the separator means in a selected position.

2. The invention as described in claim 1 wherein the adapter means further comprises a disk attached to the pulley.

3. The invention as described in claim 2 further comprising a bolt threaded into the pulley, attaching the disk to the pulley.

4. The invention as described in claim 2 wherein the disk has a reduced diameter portion located adjacent the pulley.

5. The invention as described in claim 4 wherein the separator means further comprises at least one pulley, a handle and a yoke, the yoke further having an arcuate inner periphery adapted to engage the reduced diameter portion of the adapted means.

6. The invention as described in claim 1 wherein the separator means further comprises at least one offset ear for engagement with and movement of the sheave of the pulley.

7. The invention as described in claim 6 wherein there are two offset ears, formed on the separator.

8. The invention as described in claim 7 further comprising a rotating roller attached to the offset ear.

9. The invention as described in claim 7 further comprising a rotating roller attached to each offset ear.

10. The invention as described in claim 9 wherein a pair of rollers is mounted upon each of the offset ears.

11. The invention as described in claim 1 wherein the separator means further comprises a handle and a yoke.

12. The invention as described in claim 11 wherein the yoke is adapted to engage and mate with the adapter means.

13. A device for changing belts on a variable drive ratio power transmission comprising:

an adaptor structured to be selectively joined to at least one pulley, which has sheaves urged together by at least one spring;

a separator in operable communication with the adapter; and a selective retainer for retaining the separator in a selected position.

14. The device of claim 13 wherein the adapter is selectively joined to at least one pulley, which has sheaves urged together by at least one spring.

15. The device of claim 13 wherein the separator is selectively in operable communication with the adapter.

* * * * *